United States Patent
Sandberg et al.

(10) Patent No.: US 9,221,312 B2
(45) Date of Patent: Dec. 29, 2015

(54) VEHICLE TOWING DEVICE, VEHICLE STRUCTURAL MEMBER AND VEHICLE COMPRISING A VEHICLE STRUCTURAL MEMBER

(71) Applicant: VOLVO CAR CORPORATION, Gothenburg (SE)

(72) Inventors: Anders Sandberg, Savedalen (SE); Anna Lundvall, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/219,294

(22) Filed: Mar. 19, 2014

(65) Prior Publication Data

US 2014/0291964 A1    Oct. 2, 2014

(30) Foreign Application Priority Data

Mar. 28, 2013 (EP) .................................... 13161576

(51) Int. Cl.
- *B60R 19/02* (2006.01)
- *B60D 1/04* (2006.01)
- *B60D 1/24* (2006.01)
- *B60D 1/48* (2006.01)
- *B60D 1/56* (2006.01)

(52) U.S. Cl.
CPC *B60D 1/247* (2013.01); *B60D 1/48* (2013.01); *B60D 1/488* (2013.01); *B60D 1/565* (2013.01)

(58) Field of Classification Search
CPC .............. B60D 1/00; B60D 1/04; B60D 1/52; B60D 1/56; B60D 1/565; B60D 1/48; B60D 1/488
USPC ............................. 280/495, 505; 293/102, 117
See application file for complete search history.

(56) References Cited

U.S. PATENT DOCUMENTS

| | | | |
|---|---|---|---|
| 5,716,066 A * | 2/1998 | Chou et al. ..................... | 280/501 |
| 7,472,919 B2 | 1/2009 | Pratt et al. | |
| 2007/0024027 A1 | 2/2007 | Pratt et al. | |
| 2011/0285107 A1* | 11/2011 | Ladzinski et al. ............ | 280/495 |
| 2012/0066979 A1* | 3/2012 | Brown ............................ | 49/463 |
| 2012/0292930 A1* | 11/2012 | Hermanson et al. .......... | 293/102 |

FOREIGN PATENT DOCUMENTS

| | | |
|---|---|---|
| DE | 10110332 A1 | 9/2002 |
| DE | 202009006554 U1 | 9/2010 |

(Continued)

OTHER PUBLICATIONS

Extended European Search Report Dated Sep. 11, 2013, Application No. 13161576.7-1757, Applicant Volvo Car Corporation, 7 Pages.

*Primary Examiner* — Tony Winner
(74) *Attorney, Agent, or Firm* — Brooks Kushman P.C.

(57) ABSTRACT

A vehicle towing device with a first extremity comprising a towing member, a second extremity comprising an attachment arrangement, and an elongated part extending there between is provided. The elongated part comprises a first portion and a second portion. The second portion has a conical outer contact surface extending peripherally from the first portion towards the attachment arrangement. The conical contact surface has a first cone radius at an end of the second portion facing the first portion, and a second cone radius at an end of the second portion facing the attachment arrangement. The first cone radius is larger than the second cone radius, and a longitudinal extension of the second portion exceeds the second cone radius.

20 Claims, 3 Drawing Sheets

(56) References Cited

FOREIGN PATENT DOCUMENTS

| | | |
|---|---|---|
| FR | 2909948 A1 | 6/2008 |
| JP | 4454121 B2 | 4/2010 |
| WO | 2012140930 A1 | 10/2012 |

\* cited by examiner

VEHICLE TOWING DEVICE, VEHICLE STRUCTURAL MEMBER AND VEHICLE COMPRISING A VEHICLE STRUCTURAL MEMBER

CROSS-REFERENCE TO RELATED APPLICATIONS

This application claims foreign priority benefits under 35 U.S.C. §119(a)-(d) to European patent application number EP 13161576.7, filed Mar. 28, 2013, which is incorporated by reference in its entirety.

TECHNICAL FIELD

Embodiments herein relate to a vehicle towing device. Embodiments herein further relate to a vehicle structural member and a vehicle comprising a vehicle structural member.

BACKGROUND

In order to facilitate mounting of a traction hook, JP4454121B2 discloses a guide ring with a tapered inner peripheral surface attached to an outer end surface of a bumper beam. A traction hook can be inserted through the guide ring and a threaded hook end can be fastened to a nut mounted to an inner bumper member. A tapered part of the traction hook is brought into contact under pressure with an inner peripheral surface of the guide ring.

Since the traction hook, described in JP4454121B2, comprises a tapered part the hook can be guided into the hole, which may facilitate mounting. Thanks to the relatively large distance between the inner bumper member nut and the guide ring attached to an outer end surface of a bumper beam, the mounting arrangement may provide sufficient support to withstand bending forces transferred via the hook when towing.

Since a length of the tapered surface is relatively small, bending forces acting on the hook will be distributed to both the outer and inner attachment parts. Since an angle between a center axis of the hook and the tapered part of the hook is relatively large, bending forces will also result in a relatively large pulling force in the inner bumper member nut.

The fraction hook described in JP4454121B2, comprising a relatively long cylindrical member between the inner support and the outer support, may be advantageous to use in some applications, such when no particular restrictions of bumper design exists.

WO2012140930A1 suggests a similar attachment for a towing hook. The hook comprises an inner threaded part, to be fastened to an inner nut member, and an outer cylindrical part, which receives some bending support from a washer arranged around a through hole in an outer bumper part. The hook comprises a small tapered portion, which acts like a stop against an outermost circumferential edge of the inner nut member in a longitudinal direction. In WO2012140930A1, bending forces acting on the hook are distributed to both the inner and outer attachment points, and as in JP4454121B2, a relatively large distance is required between the inner and outer attachment points, for providing sufficient support to a hook subjected to bending forces.

U.S. Pat. No. 7,472,919 B2 refers to a detachable tow hook assembly for vehicles. A bayonet end of the tow hook is inserted into a vehicle bumper receptacle and rotated to a locking position, for retention in place during towing of a vehicle. When the hook has been rotated, and no pushing force is acting on the hook, a spring member is pushing the hook outwards again until a bayonet member is in contact with an inner portion of receptacle walls. Bending forces acting on the hook in U.S. Pat. No. 7,472,919 B2 are distributed to an outer member of the bumper.

The hook arrangements mentioned above may be suitable in some situations, but improvements in the field of vehicle towing devices and vehicle structural members for receiving towing devices are still desirable, in particular if vehicle towing devices and vehicle structural members are subjects to new requirements concerning e.g., deformation or safety.

SUMMARY

Embodiments herein aim to provide a vehicle towing device eliminating or at least reducing the problems and/or drawbacks described above.

According to a first aspect, this is achieved by a vehicle towing device with a first extremity comprising a towing member, a second extremity comprising an attachment arrangement, and an elongated part extending there between, the elongated part comprising a first portion and a second portion, the first portion extending partially along the elongated part from the towing member towards the second portion, and the second portion extending partially along the elongated part from the first portion towards the attachment arrangement, wherein the second portion has a conical outer contact surface extending peripherally from the first portion towards the attachment arrangement, the conical contact surface having a first cone radius at an end of the second portion facing the first portion and a second cone radius at an end of the second portion facing the attachment arrangement, where the first cone radius is larger than the second cone radius and a longitudinal extension of the second portion exceeds the second cone radius.

Since the second portion has the conical outer contact surface with the first cone radius larger than the second cone radius, and the longitudinal extension of the second portion exceeds the second cone radius, the vehicle towing device is arranged to be attached to a vehicle structural member having a taper coupling. A taper coupling, also referred to as a taper joint, is a coupling wherein a male conical member is inserted into a complementary tapered female member. A taper coupling provides a strong and reliable coupling between the vehicle towing device and a vehicle. In addition, having a conical second portion, the vehicle towing device will be guided when inserted into a receiving part of the vehicle.

The conical contact surface is arranged such that substantially all bending forces that will act on the vehicle towing device during towing will be taken up and/or distributed via the conical contact surface. Forces acting in a longitudinal direction of the vehicle towing device will be taken up and/or distributed via the attachment arrangement. Due to this reduction of forces acting on the attachment arrangement, weaker lightweight materials, such as aluminum, can be used in the vehicle structural member and/or the vehicle towing device.

In addition to the abovementioned advantages, forces from a towline attached to the first extremity can be distributed to a vehicle from the second extremity of the vehicle towing device only. Accordingly, there is no need to support outer parts of the vehicle towing device, such as the first portion or the first extremity, by firm outer vehicle structures. With support only in or in the vicinity of the second extremity, an outer bumper structure that surrounds the vehicle towing device can be constructed with non-rigid pedestrian collision absorption zones. Thus, hereby is provided a vehicle towing device eliminating or at least reducing the problems and/or drawbacks described above.

According to a second aspect, the longitudinal extension of the second portion exceeds the first cone radius. Hereby a strong taper coupling can be achieved when the vehicle towing device is attached to a receiving part of a vehicle. Both longitudinal forces and bending forces can be taken up in or near the second extremity of the vehicle towing device.

According to a third aspect, the longitudinal extension of the second portion exceeds the length of at least two second cone radiuses. Hereby, a strong taper coupling can be achieved when the vehicle towing device is attached to a receiving part of a vehicle. A greater distance of the longitudinal extension of the second portion allows bending forces to be distributed over a larger conical contact surface.

According to a fourth aspect, an angle between a center axis in the longitudinal direction of the vehicle towing device and the conical contact surface 9 is between 0.5 and 45 degrees, or between 0.5 and 30 degrees, or between 1 and 20 degrees, or between 1.5 and 15 degrees. Since the an angle between a center axis in the longitudinal direction of the vehicle towing device and the conical contact surface 9 is between 0.5 and 45 degrees, or between 0.5 and 30 degrees, or between 1 and 20 degrees, or between 1.5 and 15 degrees, a strong taper coupling can be achieved when the vehicle towing device is attached to a receiving part of a vehicle. A small angle, such as between 0.5 and 1.5 degrees between a center axis in the longitudinal direction of the vehicle towing device and the conical contact surface is advantageous from a force-distributing aspect since a bending force will result in no or just a small amount of pulling force in the attachment arrangement. A larger angle, such as between 15-45 degrees between a center axis in the longitudinal direction of the vehicle towing device and the conical contact surface is advantageous when the vehicle towing device is inserted into a receiving part of a vehicle, since the taper coupling not will be noticeable affected by dust and dirt between the conical contact surface and the receiving part of a vehicle. Hereby tolerance requirements can be reduced which in turn can decrease production costs.

According to a fifth aspect, the conical outer contact surface extends peripherally from the first portion to the attachment arrangement. Hereby, the conical outer contact surface and the attachment arrangement can be fitted into a compact receiving part for the vehicle structural member. Hereby surrounding bumper parts are allowed to be constructed as deformation zones.

According to a sixth aspect, the conical outer contact surface extends peripherally from the first portion to a third portion arranged between the conical outer contact surface and the attachment arrangement. Hereby, the vehicle towing device can be fitted into vehicle structural members of different dimensions. The third part may also facilitate manufacturing of the vehicle towing device. A third portion can comprise e.g., a cylindrical part parallel to the elongated part, or a kerf. A kerf can be advantageous since it provides the vehicle towing device with an indication of fracture, such that fracture during overload can be controlled.

According to a seventh aspect, a peripheral outer surface of the attachment arrangement is threaded, such that it is attachable to a complementary threaded inner surface portion of an abutment surface for the vehicle towing device in a vehicle structural member. Hereby, the vehicle towing device can easily be attached to the vehicle structural member. Threads provide a cheap and reliable attachment between the vehicle towing device and the vehicle structural member. The threads on the vehicle towing device can also distribute all longitudinal forces that can be acting on the vehicle towing device to the threads arranged on the abutment surface.

According to an eight aspect, the conical outer contact surface is complementary conical to a tapered inner contact surface portion of the abutment surface for the vehicle towing device in the vehicle structural member, such that substantially the entire conical outer contact surface is allowed to be in contact with the complementary tapered inner contact surface portion of the abutment surface for the vehicle towing device in the vehicle structural member when the threaded peripheral outer surface of the attachment arrangement is attached to the complementary threaded inner surface portion of the abutment surface for the vehicle towing device in the vehicle structural member. Since the conical outer contact surface is complementary conical to a tapered inner contact surface portion such that substantially the entire conical outer contact surface is allowed to be in contact with the complementary tapered inner contact surface, bending forces can be distributed between the vehicle towing device and the vehicle structural member.

The conical outer contact surface and the tapered inner contact surface portion of the abutment surface for the vehicle towing device in the vehicle structural member forms a taper coupling when the threads of the vehicle towing device engages the threads of the abutment surface. A taper coupling can handle bending forces acting on the vehicle towing device, for example during towing. The tapered inner contact surface portion of the abutment surface will provide the conical outer contact surface with support over substantially its entire surface, such that bending forces acting on the vehicle towing device can be taken up. Hereby, an attachment arrangement, for example threads or a bayonet coupling, only needs to take up forces acting in the longitudinal direction of the vehicle towing device.

According to a ninth aspect, the attachment arrangement comprises a first bayonet member, such that the first bayonet member is attachable to a complementary second bayonet member arranged at the abutment surface for the vehicle towing device in the vehicle structural member. Hereby a strong and reliable coupling between the vehicle towing device and the vehicle structural member is achieved.

According to a tenth aspect, the conical outer contact surface is complementary conical to a tapered inner contact surface portion of an abutment surface for the vehicle towing device in the vehicle structural member, such that substantially the entire conical outer contact surface is allowed to be in contact with the complementary tapered inner contact surface portion of the abutment surface for the vehicle towing device in the vehicle structural member when the first bayonet member is attached to the second bayonet member. Hereby, substantially all bending forces that act on the vehicle towing device during towing are taken up and/or distributed via the conical contact surface.

The conical outer contact surface and the tapered inner contact surface portion of the abutment surface for the vehicle towing device in the vehicle structural member forms a taper coupling when the first bayonet member is attached to the second bayonet member. The taper coupling takes up bending forces acting on the vehicle towing device, for example during towing. The tapered inner contact surface portion of the abutment surface provides the conical outer contact surface with support over substantially its entire surface, such that bending forces acting on the vehicle towing device is taken up.

Embodiments herein also aim to provide a vehicle structural member for receiving a vehicle towing device without the problems or drawbacks described above.

According to an eleventh aspect, the object is achieved by a vehicle structural member for receiving a vehicle towing device, where the vehicle structural member comprises an abutment surface for the vehicle towing device, and the abutment surface comprises an attachment surface portion and an inner contact surface portion which is complementary tapered to the conical peripheral outer surface of the second portion. Hereby, the vehicle towing device can be firmly attached to the vehicle structural member. The attachment surface portion can take up longitudinal forces and the inner contact surface portion which is complementary tapered to the conical peripheral outer surface of the second portion can take up bending forces.

According to a twelfth aspect, the attachment surface portion is arranged adjacent to the tapered inner contact surface portion. Hereby, the attachment surface portion and the tapered inner contact surface portion can be fitted into a compact part or portion of the vehicle structural member. A compact part or portion of the vehicle structural member allows surrounding bumper parts to be deformable, which can enhance safety for e.g., pedestrians. It can also be advantageous to gather the attachment surface portion and the tapered inner contact surface portion from a cost- and weight perspective, since they can be fitted into a small part or portion of the vehicle structural member.

According to a thirteenth aspect, the attachment surface portion is a complementary threaded inner surface portion with respect to a peripheral outer threaded surface of the attachment arrangement. Hereby, the vehicle towing device and the vehicle structural member can be attached to each other via the threads.

According to a fourteenth aspect, the attachment surface portion comprises a second bayonet member such that the second bayonet member is attachable to the first bayonet member of the attachment arrangement. Hereby, a bayonet coupling can be used for attaching the vehicle towing device and the vehicle structural member.

Embodiments herein also aim to provide a vehicle arranged to engage a vehicle towing device without the problems or drawbacks described above.

According to a fifteenth aspect, a vehicle comprises a vehicle structural member arranged to engage a vehicle towing device, the vehicle towing device comprising a second portion with a conical outer contact surface having a first cone radius larger than a second cone radius, and where a longitudinal extension of the second portion exceeds the second cone radius. Since the vehicle comprises a vehicle structural member arranged to engage a vehicle towing device, the vehicle and the vehicle structural member are arranged to be attached with the vehicle towing device with a taper coupling. A taper coupling provides a strong and reliable coupling between the vehicle towing device and a vehicle, allowing bending forces to be distributed between the vehicle towing device and the vehicle structural member via the conical outer contact surface.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
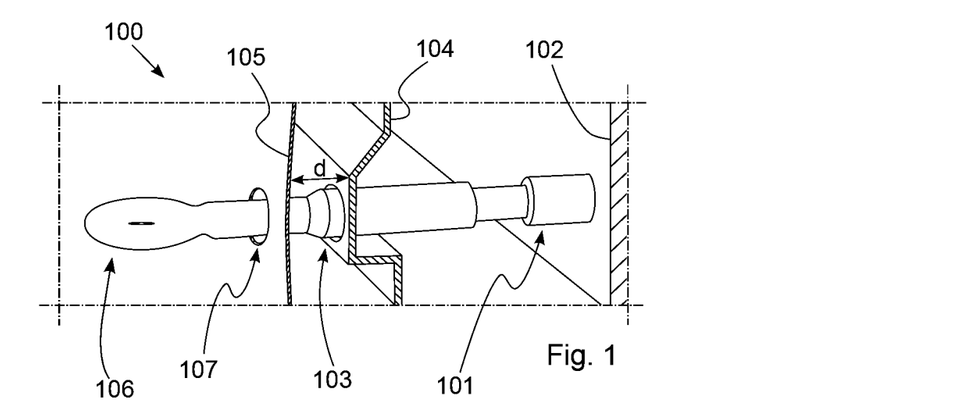
FIG. 1 illustrates a perspective view of a prior art vehicle towing device.

FIG. 1 illustrates a prior art vehicle towing device 100. The vehicle towing device 100 requires an inner attachment structure 101 on an inner structural part 102, and an outer support structure 103, arranged on a firm outer structure 104. The structural part 102 and the firm outer structure 104 are normally arranged under front and/or rear bumper skin structures 105 of a vehicle. The inner attachment structure 101 mainly takes up forces acting along a longitudinal direction of the vehicle towing device 100, while the outer support structure 103 is needed for supporting the vehicle towing device 100 when forces in other directions, such as transversal or semi-transversal forces, act on the vehicle towing device 100. An outer bumper skin structure 105 is illustrated between the firm outer structure 104 and a towing member 106 of the vehicle towing device 100. A recess 107 in the bumper skin structure 105 allows a user to fasten the vehicle towing device 100 to the structures beneath the bumper skin structure 105. In FIG. 1, also a distance d between the bumper skin structure 105 and the outer support structure 103 is illustrated. The distance d is the distance where parts outside the outer support structure 103 may deform against the outer support structure 103 when subjected to a force, e.g., during a collision with a pedestrian or a vehicle. A larger distance d may increase a vehicle soft deformation zone, whereby pedestrian collision performance and low speed crash performance can be increased.

Figure 2:
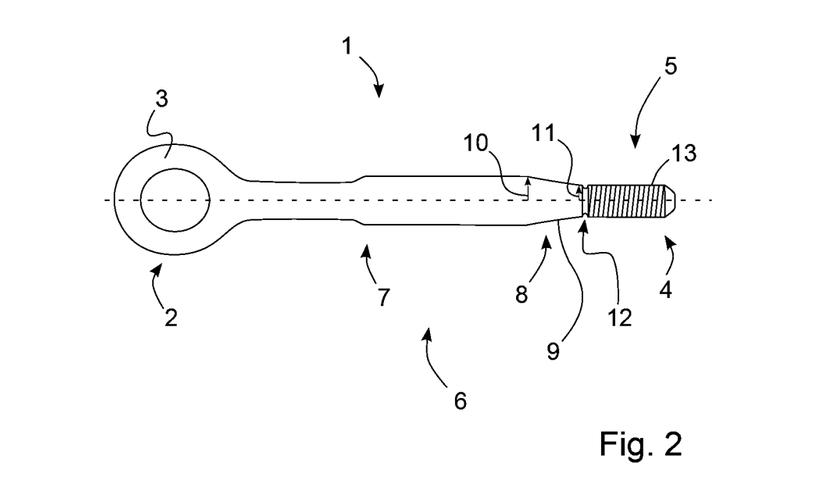
FIG. 2 illustrates a vehicle towing device according to some embodiments hereof.

FIG. 2 illustrates a vehicle towing device 1 according to some embodiments. The vehicle towing device 1 comprises a first extremity 2 comprising a towing member 3, a second extremity 4 comprising an attachment arrangement 5, and an elongated part 6 extending there between. A center axis in the longitudinal direction of the vehicle towing device 1 is illustrated with a dashed line in the figure. The elongated part 6 comprises a first portion 7 and a second portion 8. The first portion 7 extends partially along the elongated part 6 from the towing member 3 towards the second portion 8, and the second portion 8 extends partially along the elongated part 6 from the first portion 7 towards the attachment arrangement 5. The second portion 8 has a conical outer contact surface 9 extending peripherally from the first portion 7 towards the attachment arrangement 5. The conical contact surface 9 has a first cone radius 10 at an end of the second portion 8 facing the first portion 7 and a second cone radius 11 at an end of the second portion 8 facing the attachment arrangement 5.

In the embodiment illustrated in FIG. 2, the towing member 3 is arranged as a closed circle. A closed towing member 3 can be advantageous since it, compared to its weight, has a very high structural strength. Therefore relatively small dimensions can be used, which reduces the weight and size of the towing member 3. In addition, a closed towing member 3 provides a simple and secure attachment member for towlines and the like. Other shapes of the towing member 3 are possible, such as an oval or rectangular shape.

According to FIG. 2, the first portion 7 is generally cylindrical with one cylinder diameter towards the towing member 3 and another diameter towards the second portion 8. The different cylinder diameters meet via a cone-shaped middle portion. This shape is advantageous since a smaller diameter of at least a part of the first portion towards the towing member 3 reduces the weight, while the larger diameter allows a first cone diameter 10 at the second portion 8 to be relatively large. According to other embodiments, the first portion 7 is substantially conical, or substantially cylindrical with the same diameter throughout its entire length. Other cross-sections of the first portion 7 are also possible.

The conical contact surface 9 has a first cone radius 10 at an end of the second portion 8 facing the first portion 7 and a second cone radius 11 at an end of the second portion 8 facing the attachment arrangement 5. As illustrated, the first cone radius 10 is larger than the second cone radius 11. A longitudinal extension of the second portion 8 exceeds a length of the second cone radius 11.

According to the embodiment illustrated in FIG. 2, a third portion 12 is arranged between the attachment arrangement 5 and the second portion 8. The third portion 12 can comprise e.g., a kerf. It can be advantageous to provide the vehicle towing device 1 with a kerf since it provides the vehicle towing device 1 with an indication of fracture, such that a potential fracture during overload can be controlled. A peripheral outer surface 13 of the attachment arrangement 5 is threaded, such that it is attachable to a complementary threaded inner surface portion of an abutment surface for the vehicle towing device 1 in a vehicle structural member.

Figure 3:
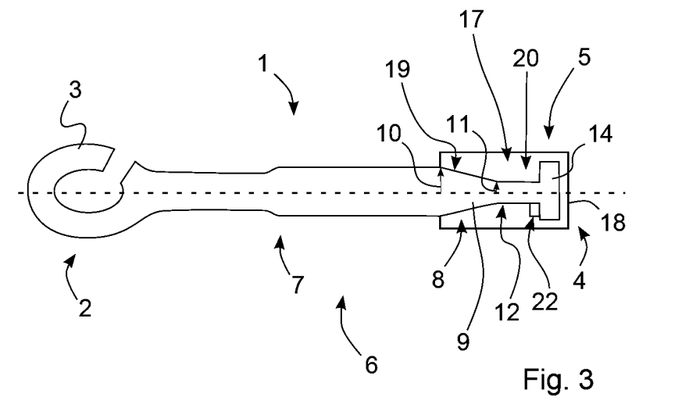
FIG. 3 illustrates a vehicle towing device and a vehicle structural member according to some embodiments hereof.

FIG. 3 illustrates a vehicle towing device 1 according to some embodiments. The vehicle towing device 1 comprises a first extremity 2 comprising a towing member 3, a second extremity 4 comprising an attachment arrangement 5, and an elongated part 6 extending there between. According to this illustrated embodiment, the towing member 3 is arranged as an open towing hook.

A center axis of the vehicle towing device 1 is illustrated with a dashed line in the figure. The elongated part 6 comprises a first portion 7 and a second portion 8. The second portion 8 has a conical outer contact surface 9 extending peripherally from the first portion 7 towards the attachment arrangement 5. The conical contact surface 9 has a first cone radius 10 at an end of the second portion 8 facing the first portion 7 and a second cone radius 11 at an end of the second portion 8 facing the attachment arrangement 5. The first cone radius 10 is larger than the second cone radius 11 and a longitudinal extension of the second portion 8 exceeds the second cone radius 11. Between the second portion 8 and the attachment arrangement 5 is arranged a substantially cylindrical third portion 12.

FIG. 3 also illustrates a vehicle structural member 18 according to some embodiments. The vehicle structural member 18 comprises an abutment surface 17 for the vehicle towing device 1. The abutment surface 17 comprises an attachment surface portion 20 and an inner contact surface portion 19, which is complementary tapered to the conical peripheral outer surface 9 of the second portion 8. The vehicle structural member 18 can be formed as a separate part, attachable to other vehicle structural members or structures, brackets, beams, vehicle chassis, vehicle frames or the like. Alternatively the vehicle structural member 18 is formed as a part of other vehicle structural members or structures, brackets, beams, vehicle chassis, vehicle frames or the like.

The attachment arrangement 5 comprises a first bayonet member 14 attachable to a complementary second bayonet member 22 arranged on the abutment surface 17 for the vehicle towing device 1 in the vehicle structural member 18. According to the illustrated embodiment, substantially the entire conical outer contact surface 9 is allowed to be in contact with the complementary tapered inner contact surface portion 19 of the abutment surface 17 for the vehicle towing device 1 in the vehicle structural member 18 when the first bayonet member 14 is attached to the second bayonet member 22.

Figure 4:
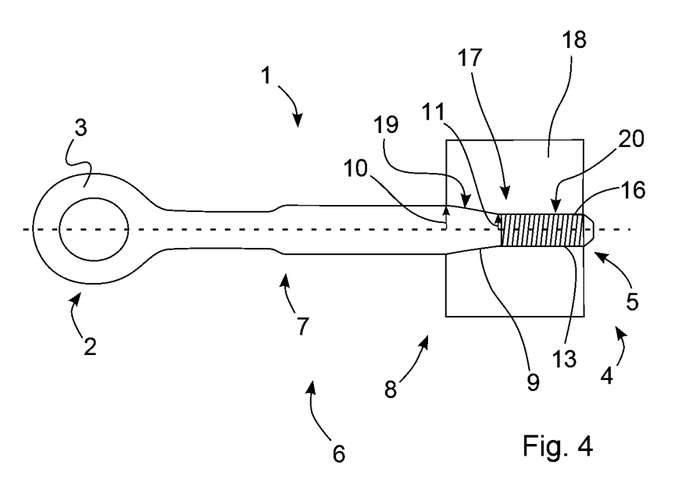
FIG. 4 illustrates a vehicle towing device and a vehicle structural member according to some embodiments hereof.

FIG. 4 illustrates a vehicle towing device 1 according to some embodiments. The vehicle towing device 1 comprises a first extremity 2 comprising a towing member 3, a second extremity 4 comprising an attachment arrangement 5, and an elongated part 6 extending there between. A center axis of the vehicle towing device 1 is illustrated with a dashed line in the figure. The elongated part 6 comprises a first portion 7 and a second portion 8. The second portion 8 has a conical outer contact surface 9 extending peripherally from the first portion 7 to the attachment arrangement 5. The conical contact surface 9 has a first cone diameter 10 at an end of the second portion 8 facing the first portion 7, and a second cone diameter 11 at an end of the second portion 8 facing the attachment arrangement 5. The first cone diameter 10 is larger than the second cone diameter 11.

The abutment surface 17 comprises an attachment surface portion 20 and an inner contact surface portion 19 which is complementary tapered to the conical peripheral outer surface 9 of the second portion 8. Substantially the entire conical outer contact surface 9 is in contact with the complementary tapered inner contact surface portion 19 of the abutment surface 17 when the threaded peripheral outer surface 13 is attached to a complementary threaded inner surface portion 16.

In the embodiment illustrated in FIG. 4, a finishing end of the second extremity 4 is chamfered such that insertion of the second extremity 4 into the vehicle structural member 18 is facilitated. When the threads of the attachment arrangement 5 are screwed into the threads of the vehicle structural member 18 such that the conical outer contact surface 9 is pressed against the inner contact surface portion 19, both longitudinal and non-longitudinal forces can be transferred between the vehicle towing device 1 and the vehicle structural member 18. Longitudinal forces are dragging and/or pushing forces, acting substantially along the center axis of the vehicle towing device 1, for example when a vehicle is towed straight forward. These longitudinal forces are transferred between the threaded portion 16 and the threaded outer surface 13. Therefore, the threads only need to be dimensioned to transfer longitudinal forces.

Non-longitudinal forces can also be referred to as bending forces. Bending forces are transferred between the vehicle towing device 1 and the vehicle structural member 18 when a towline is attached to the towing member 3 and pulled in a direction other than straight forward in the longitudinal direction. Bending forces are transferred between the conical outer contact surface 9 and the tapered inner contact surface portion 19.

Figure 5:
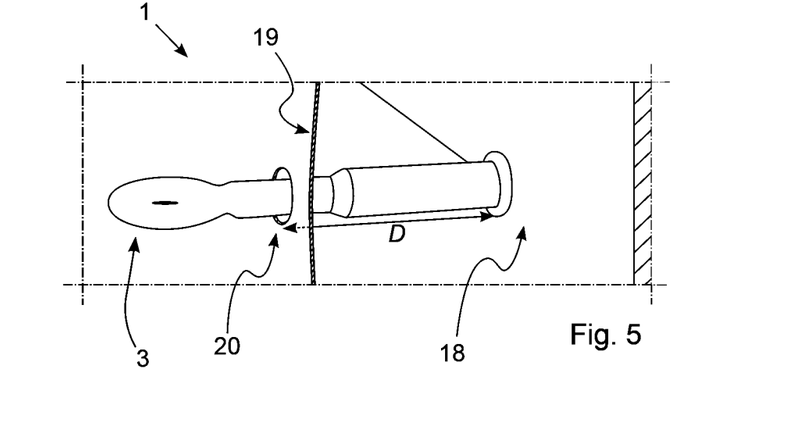
FIG. 5 illustrates a perspective view of a vehicle towing device and a vehicle structural member according to some embodiments hereof.

FIG. 5 illustrates a vehicle towing device 1 with a towing member 3 according to some embodiments. The vehicle towing device 1 is attached to a vehicle structural member 18. The vehicle structural member 18 is a part of or is rigidly attached to a bumper beam or the like. The vehicle structural member 18 and the bumper beam can be arranged in the front part or a rear part of a vehicle, such that the vehicle towing device 1 can be used when towing a vehicle forward or backward. As illustrated in FIG. 5, the vehicle structural member 18 and the bumper beam are arranged beneath a bumper skin structure 19. A recess 20 in the bumper skin structure 19 allows fastening of the vehicle towing device 1 to the vehicle structural member 18 beneath the bumper skin structure 19. The recess 20 can be covered with a lid or cover when not used.

When a person desires to attach the vehicle towing device 1 to a vehicle via the vehicle structural member 18, he/she removes the lid or cover such that the recess 20 is accessible. Then he/she inserts the vehicle towing device 1 through the recess 20 until the second extremity 4 is in contact with the vehicle structural member 18. He/she rotates the vehicle towing device 1 around its center axis such that the attachment arrangement 5 engages the attachment surface portion 20 until the conical contact surface 9 is pressed against the complementary tapered inner surface 19 until no further rotation is possible.

In FIG. 5, both the attachment arrangement and the conical contact surface are covered by the vehicle structural member 18. Threads or a bayonet member of the vehicle towing device 1 can take up longitudinal loads from threads or a bayonet member of the vehicle structural member 18. Bending forces are transferred between the conical contact surface of the vehicle towing device 1 and the complementary tapered inner surface of the abutment surface of the vehicle structural member 18.

In FIG. 5, also a distance D between the bumper skin structure 19 and the vehicle structural member 18 is illustrated. As seen when comparing the distance d between the bumper skin structure 105 and the outer support structure 103 according to the prior art towing arrangement illustrated in FIG. 1, with the distance D between the bumper skin structure 19 and the vehicle structural member 18 according to the embodiment described in FIG. 5, distance D is considerably larger than distance d.

Since the vehicle towing device 1 comprises a conical contact surface, capable of taking up forces in non-longitudinal directions, no outer support structure is needed for supporting the vehicle towing device 1 in non-longitudinal directions. Thanks to this, the distance D between the bumper skin structure 19 and the vehicle structural member 18 is relatively large. Hereby soft vehicle deformation zones between a bumper skin structure and rigid parts beneath the bumper skin structure can be increased without increasing a longitudinal length of the vehicle. Vehicle deformation zones are arranged to deform such that forces between colliding objects may be reduced. When collision forces between e.g., a vehicle and a pedestrian are reduced, safety can be enhanced.

Figure 6:
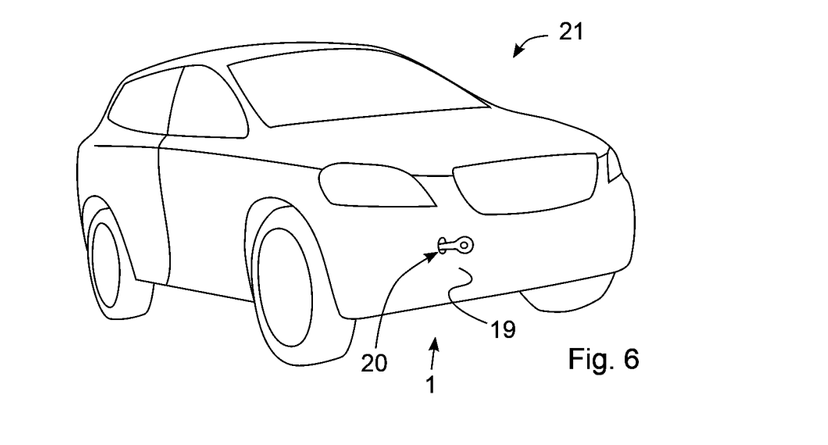
FIG. 6 illustrates a vehicle towing device mounted to a vehicle.

FIG. 6 illustrates a vehicle 21 comprising a vehicle structural member and a vehicle towing device 1. The vehicle towing device is attached to the vehicle structural member via the recess 20 in the bumper skin structure 19. In FIG. 6, the vehicle towing device 1 is attached in a vehicle structural member in the front of a vehicle 21.

Although the aspects have been described with reference to example embodiments, many different alterations, modifications and the like will become apparent for those skilled in the art. For example, a vehicle structural member can be provided with more than one opening for attachment of a vehicle towing device. A vehicle can comprise several different vehicle structural members for attachment of a vehicle towing device, such that a person can choose where to attach the vehicle towing device. For example, a vehicle can be provided with openings for attachment of a vehicle towing device on a left, middle and right front part, and on a left, middle and right rear part. Other attachment arrangements than threads or bayonet couplings can be used.

The type of vehicle towing device described above is sometimes referred to as a vehicle emergency towing device, to distinguish it from other vehicle towing devices used for other towing purposes, such as for towing of trailers, caravans and similar.

Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle towing device comprising:
   a first extremity comprising a towing member;
   a second extremity comprising an attachment arrangement; and
   an elongated part extending between the towing member and the attachment arrangement, the elongated part comprising a first portion and a second portion, the first portion extending partially along the elongated part from the towing member toward the second portion, and the second portion extending partially along the elongated part from the first portion toward the attachment arrangement, wherein the second portion has a conical outer contact surface extending peripherally from the first portion to a location proximate the attachment arrangement, the conical contact surface having a first cone radius at an end of the second portion facing the first portion, and a second cone radius at an end of the second portion facing the attachment arrangement, wherein the first cone radius is larger than the second cone radius, and a longitudinal extension of the second portion exceeds the second cone radius, and wherein the conical contact surface is configured to contact a tapered inner contact surface portion of a vehicle structural member such that bending forces are transferable between the conical contact surface and the tapered inner contact surface portion without further contact between further support structure and the towing device outside the conical contact surface.

2. The vehicle towing device according to claim 1 wherein the longitudinal extension of the second portion exceeds the first cone radius.

3. The vehicle towing device according to claim 1 wherein the longitudinal extension of the second portion is greater than twice the second cone radius.

4. The vehicle towing device according to claim 1 wherein an angle between a center axis in the longitudinal direction of the vehicle towing device and the conical contact surface is between 0.5 and 45 degrees.

5. The vehicle towing device according to claim 1 wherein an angle between a center axis in the longitudinal direction of the vehicle towing device and the conical contact surface is between 0.5 and 30 degrees.

6. The vehicle towing device according to claim 1 wherein an angle between a center axis in the longitudinal direction of the vehicle towing device and the conical contact surface is between 1 and 20 degrees.

7. The vehicle towing device according to claim 1 wherein an angle between a center axis in the longitudinal direction of the vehicle towing device and the conical contact surface is between 1.5 and 15 degrees.

8. The vehicle towing device according to claim 1 wherein the conical outer contact surface extends peripherally from the first portion to the attachment arrangement.

9. The vehicle towing device according to claim 1 wherein the conical outer contact surface extends peripherally from the first portion to a third portion arranged between the conical outer contact surface and the attachment arrangement.

10. The vehicle towing device according to claim 1 wherein the attachment arrangement comprises a threaded, peripheral outer surface, such that the attachment arrangement is attachable to a complementary threaded inner surface portion of an abutment surface for the vehicle towing device in a vehicle structural member.

11. The vehicle towing device according to claim 10 wherein the conical outer contact surface is complementary to a tapered inner contact surface portion of the abutment surface in the vehicle structural member, such that substantially the entire conical outer contact surface is allowed to be in contact with the complementary tapered inner contact surface portion of the abutment surface in the vehicle structural member when the threaded peripheral outer surface of the attachment arrangement is attached to the complementary threaded inner surface portion of the abutment surface in the vehicle structural member.

12. The vehicle towing device according to claim 1 wherein the attachment arrangement comprises a first bayonet member that is attachable to a complementary second bayonet member arranged at an abutment surface for the vehicle towing device in a vehicle structural member.

13. The vehicle towing device according to claim 12 wherein the conical outer contact surface is complementary to a tapered inner contact surface portion of the abutment surface in the vehicle structural member, such that substantially the entire conical outer contact surface is allowed to be in contact with the complementary tapered inner contact surface portion of the abutment surface in the vehicle structural member when the first bayonet member is attached to the second bayonet member.

14. A vehicle structural member for receiving the vehicle towing device according to claim 1, wherein the vehicle structural member comprises an abutment surface for the vehicle towing device, and the abutment surface comprises an attachment surface portion and an inner contact surface portion which is complementarily tapered to the peripheral conical outer contact surface of the second portion of the vehicle towing device.

15. The vehicle structural member according to claim 14 wherein the attachment surface portion is arranged adjacent to the tapered inner contact surface portion.

16. The vehicle structural member according to claim 15 wherein the attachment surface portion is a threaded inner surface portion that is complementary with respect to a peripheral outer threaded surface of the attachment arrangement of the vehicle towing device.

17. The vehicle structural member according to claim 15 wherein the attachment surface portion comprises a second bayonet member that is attachable to a first bayonet member of the attachment arrangement of the vehicle towing device.

18. A vehicle comprising a vehicle structural member arranged to engage the vehicle towing device according to claim 1.

19. The vehicle towing device of claim 1 wherein the conical contact surface is the only conical contact surface of the towing device for transferring bending forces from the towing device.

20. The vehicle towing device of claim 1 wherein the conical contact surface is the only conical contact surface of the towing device configured to contact a vehicle structural member when the towing device is mounted on a vehicle.

* * * * *